Aug. 7, 1962   H. S. FEGELY ETAL   3,048,742
AUTOMATIC FAULT FINDER SYSTEM
Filed Dec. 11, 1959
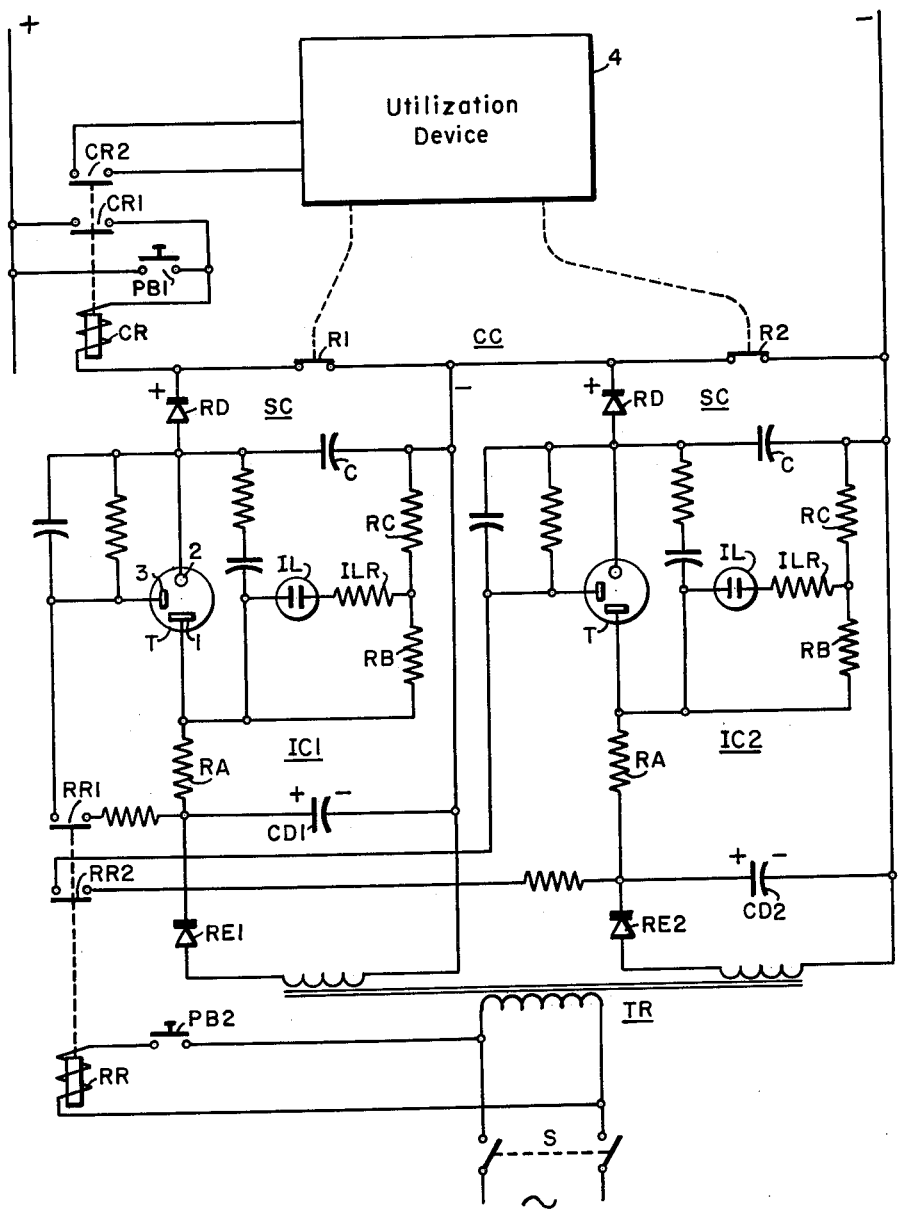
WITNESSES:
Leon M. Garman
James F. Young
INVENTORS
Hugh S. Fegely and
Robert D. Till.
BY
Ernest P. Klipfel
ATTORNEY

United States Patent Office 3,048,742
Patented Aug. 7, 1962

3,048,742
AUTOMATIC FAULT FINDER SYSTEM
Hugh S. Fegely and Robert D. Till, Buffalo, N.Y., assignors to Westinghouse Electric Corporation, East Pittsburgh, Pa., a corporation of Pennsylvania
Filed Dec. 11, 1959, Ser. No. 859,025
9 Claims. (Cl. 315—205)

The invention relates generally to automatic fault finder systems and more particularly to a memory type automatic fault finder system capable of delayed operation, allowing transient conditions of unharmful duration to clear the system.

Many conventional automatic fault finder systems have the characteristic of being extremely sensitive and fast in response. In most applications, fast response may be desirable, but in some applications it is preferable to allow faults of short duration, say less than 0.1 second, to occur without annunciation. Such short duration circuit interruptions may frequently occur on heavy duty control panels due to the mechanical vibration and shock of the panel when large contactor devices operate. Circuit interruptions due to such causes, should not be annunciated unless they are sufficiently long to actually affect the controlled operations.

The present invention is an improvement on the automatic fault finder system disclosed and claimed in a copending application Serial No. 803,952, filed April 3, 1959, now Patent 2,957,107 issued October 18, 1960, and assigned to the same assignee. The improvement resides in the ability of the automatic fault finder system to allow transients of unharmful duration to pass without operation of the annunciator system.

It is an object of the present invention to provide an automatic fault finder system capable of preventing undesired annunciation due to faults of unharmful duration.

A more specific object of the present invention is to provide an automatic fault finder system having a time delay which permits transient conditions to pass.

Another object of the present invention is to provide an automatic fault finder system wherein the effects of a direct current voltage appearing across a monitored contact when it opens will be blocked from providing a false functioning of the annunciator system.

Further objects and advantages of the present invention will be readily apparent from the following detailed description taken in conjunction with the drawing in which the sole FIGURE is a schematic diagram of an illustrative embodiment of the invention.

The present invention is illustrated embodied in an automatic fault finder system for a control circuit CC of a utilization device 4. The contacts to be monitored are indicated as R1 and R2 serially connected with the operating coil of a control relay CR and a momentary contact push button PB1 across an appropriate supply of voltage indicated as direct current L1, L2 of a designated polarity. The contacts R1 and R2 may be controlled by external means or may be mechanically linked to the utilization device 4 in such a manner that the contacts R1 and R2 are closed upon initial starting of the system. It is to be understood that contacts or switches which may not be connected in the control circuit may equally well be monitored and additional contacts or switches may be serially connected in the illustrated control circuit CC. While the control circuit CC is illustrated connected across a direct current power source L1, L2 so that a direct current potential will appear across each contact of a monitor, it is not a requirement for proper operation of the present invention and the automatic fault finder system will operate equally well without an external direct current voltage across the contacts of the particular contact or switch to be monitored.

Whenever all of the series connected contacts R1, R2 are closed, the push button PB1 is utilized to initiate starting of the system. Upon actuation of the control relay CR, a set of normally open contacts CR1 bypass the momentary contact push button PB1 while a second set of contacts CR2, normally open, close to energize the utilization device 4.

The present invention is embodied in an automatic fault finding system which provides each switch or contact to be monitored with a separate individual indicating circuit. Accordingly, contacts R1 and R2 are monitored by respective indicating circuits 1C1 and 1C2.

As more fully explained in the aforementioned copending application, a separate isolated direct current source is provided for each indicating circuit through the transformer TR connected to a source of alternating current through a line switch S. Rectifiers RE1 and RE2 and capacitors CD1 and CD2, respectively, filter the alternating current ripple and provide the isolated direct current source for each indicating circuit IC1 and IC2, respectively.

Across each individual direct current source is connected a voltage divider circuit comprising the resistors RA, RB and RC.

Each individual indicating circuit for a switch to be monitored is provided with a gaseous discharge tube such as a cold cathode, gas filled, miniature type tube T. Each tube has an anode 1, a cathode 2, and a starting electrode 3.

Each indicating circuit is also provided with an indicating lamp IL serially connected with a resistor ILR across a portion of the voltage divider circuit. Each tube T is connected across a larger portion of the voltage divider circuit in such a manner that conduction in the tube T will result in insufficient voltage across the indicating lamp IL to cause it to fire. On the other hand, when conduction in the tube T ceases the voltage across the indicating lamp IL will be sufficient to fire the neon lamp. The characteristics of the lamp IL are chosen to be such that the indicating light IL will continue conduction once fired at a magnitude considerably less than the magnitude of voltage required for its firing.

The anode 1 and cathode 2, in each indicating circuit, are connected across the larger portion of the voltage divider circuit by means of a common series circuit SC. Each common series circuit includes the anode and cathode of the tube T, a rectifier RD and the monitored contact R1 and R2 for the indicating circuits IC1 and IC2 respectively. A capacitor C is connected across the rectifier RD and the monitored contact. As will be more fully explained hereinafter the rectifier RD could be omitted when direct current does not appear across the monitored contact.

To initiate operation of the indicating circuit after the line switch S has been closed, a reset switch PB2 is closed, which closes contacts RR1 and RR2 of the reset relay RR in a starting electrode circuit for each glow tube. The tube T is fired and continues to conduct when the reset relay RR is deenergized through release of the reset push button PB2. Hence, current flow results in the common series circuit SC until a monitored contact is opened. Once extinguished the tube T will not again be conductive until the starting circuit is reenergized.

When a monitored contact opens, charging current will flow in the capacitor C limited by the circuit resistance of the indicating circuit IC. This charging current keeps the tube T in a conducting state until the charging current falls below some minimum value necessary to maintain conduction of the gaseous tube T. Without the capacitor C, tube conduction would cease immediately upon opening of the monitored contact R. Thus, capacitor C provides a time delay which permits transient conditions to pass without operation of the indicating light IL.

The rectifier RD in each indicating circuit serially connected with the capacitor C across the relay to be monitored is required in the event that external conditions are such that a direct current voltage will appear across the monitored contact when it opens. In this case, the external voltage must be blocked so that it will not have any effect on the charging of the capacitor C. Without the blocking rectifier RD, the capacitor C will charge almost instantly as a result of the voltage across the power leads L1 and L2 and the desired delay would be lost. The blocking rectifier RD may be omitted when direct current external voltage is not present. For purposes of standardization however, it may be desirable to supply the rectifier RD in either case and the circuit will function perfectly well in either case.

Thus, it is apparent that the present invention has provided a means for adding a short time delay to the previously disclosed circuitry in the aforementioned copending application and as a result prevents undesired annunciation due to transient conditions which may momentarily open the monitored contact but have no harmful effect upon the system and hence may be ignored by the automatic fault finder system.

While one specific embodiment of this invention has been illustrated and described, it is to be understood that various modifications, substitutions and alterations within the spirit and scope of the invention are herein meant to be included.

We claim as our invention:

1. A monitoring system for a switch comprising, in combination; a pair of terminals adapted to be connected across said switch; voltage means connected to said terminal for causing direct current flow through said switch when connected to said terminals; capacitive means connected across said terminals; indicating means responsive to said direct current being less than a predetermined magnitude operably connected to said capacitive means and said terminals for indicating when an open circuit occurs across said terminals; said capacitive means adapted to charge with a charging current exceeding said predetermined magnitude for a selected time delay after an open circuit occurs across said terminals.

2. A monitoring system comprising, in combination; a switch; voltage means connected to said switch for causing direct current flow through said switch; capacitive means connected across said switch; indicating means responsive to direct current less than a predetermined magnitude operably connected to said capacitive means and said switch for indicating when the switch is open; said capacitive means adapted to charge with a charging current exceeding said predetermined magnitude for a selected time delay after opening of said switch; and circuit means for discharging said capacitive means without operation of said indicating means when said switch is closed within said selected time delay.

3. A monitoring system comprising, in combination; a switch; voltage means connected to said switch for causing direct current flow through said switch; capacitive means and rectifier means serially connected across said switch; indicating means responsive to direct current less than a predetermined magnitude operably connected to said capacitive means and said switch for indicating when the switch is open; said capacitive means adapted to charge with a charging current exceeding said predetermined magnitude for a selected time delay after opening of said switch; said rectifier means poled to block direct current from said switch to said capacitive means when said switch is opened; and circuit means for discharging said capacitive means without operation of said indicating means when said switch is closed within said selected time delay.

4. A monitoring system for a control circuit including a switch and adapted to have a direct current control voltage suplied thereto comprising, in combination; a pair of terminals adapted to be connected across said switch; voltage means connected to said terminals for causing direct current flow through said switch when connected to said terminals; capacitive means and rectifier means serially connected across said terminals; indicating means responsive to said direct current from said voltage means being less than a predetermined magnitude operably connected across said capacitive means and said terminals for indicating when an open circuit occurs across said terminals; said capacitive means adapted to charge with a charging current exceeding said predetermined magnitude for a selected time delay after an open circuit occurs across said terminals; said rectifier means poled to block the application of said direct current control voltage to said capacitive means.

5. In an automatic fault finder system, a plurality of switches to be monitored, a gaseous discharge tube for each switch having an anode, a cathode, and a starting electrode; said anode and cathode connected in a common series circuit with its associated switch to be monitored; capacitive means for each switch connected across its associated switch; means for connecting an individual direct current source across each respective common series circuit; means for energizing each starting electrode to start conduction of each said tube; indicating means responsive to the non-conduction of said tube for indicating when the switch is open; said tube being rendered non-conductive when current flow therethrough is less than a predetermined magnitude; said capacitive means adapted to charge with a charging current exceeding a predetermined magnitude for a selected time delay after opening of said switch.

6. In an automatic fault finder system, a plurality of switches to be monitored, a gaseous discharge tube for each switch having an anode, a cathode, and a starting electrode, said anode and cathode connected in a common series circuit with its associated switch to be monitored; means for connecting an individual direct current source across each respective common series circuit; means for energizing each starting electrode to start conduction of each said tube; indicating means operably connected to each said common series circuit and responsive to the nonconduction of the tube of each said circuit for indicating when the switch of each said circuit is open; said capacitive means allowing the flow of charging current upon the opening of said switch, said charging current keeping the tube conducting until the magnitude of the charging current is less than a predetermined minimum required to maintain conduction through said tube.

7. The automatic fault finder system of claim 6 characterized in that said switches to be monitored are connected in series circuit relationship to each other.

8. In an automatic fault finder system, a control circuit having a plurality of switches to be monitored, a like plurality of gaseous discharge tubes each having an anode, a cathode, and a starting electrode, a like plurality of individual circuits each including a respective one of said plurality of switches in series circuit relationship with the anode and cathode of a respective one of said plurality of said tubes, means for providing a plurality of direct current sources each connected across a respective one of said individual circuits, means operably connected to each said tube responsive to the nonconduction of its associated tube for providing an indication of the conductive state of each switch, said means for providing an indication being of the latched type so that the indication continues if the switch is reclosed; rectifier means and capacitive means serially connected across each said switch to be monitored, said capacitive means allowing the flow of charging current upon the opening of said switch, said charging current keeping the tube conducting until the magnitude of a charging current is less than a predetermined minimum required to maintain conduction through said tube, said rectifier means for each said switch being poled to block direct current flow from said control circuit to said capacitive means.

9. The automatic fault finder system of claim 8 characterized in that said switches to be monitored are connected in series in the control circuit with said control circuit adapted to have a direct current voltage applied thereto.

References Cited in the file of this patent
UNITED STATES PATENTS

| | | |
|---|---|---|
| 2,513,396 | Beck | July 4, 1950 |
| 2,558,637 | Walz | June 26, 1951 |
| 2,735,086 | Blakely | Feb. 14, 1956 |
| 2,763,812 | McKinney | Sept. 18, 1956 |